(12) United States Patent
Scheulin et al.

(10) Patent No.: US 10,341,746 B2
(45) Date of Patent: Jul. 2, 2019

(54) SENSOR SYSTEM WITH A SENSOR DATA BUFFER

(71) Applicant: Robert Bosch GmbH, Stuttgart (DE)

(72) Inventors: Matthias Scheulin, Buggingen (DE); Rainer Dorsch, Dettenhausen (DE); Dorde Cvejanovic, Munich (DE); Jan Hayek, Munich (DE); Urs Kanus, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/309,684

(22) PCT Filed: Mar. 20, 2015

(86) PCT No.: PCT/EP2015/055906
§ 371 (c)(1),
(2) Date: Nov. 8, 2016

(87) PCT Pub. No.: WO2015/176846
PCT Pub. Date: Nov. 26, 2015

(65) Prior Publication Data
US 2017/0155979 A1    Jun. 1, 2017

(30) Foreign Application Priority Data
May 20, 2014  (DE) .................. 10 2014 209 600

(51) Int. Cl.
*H04L 29/08* (2006.01)
*H04L 12/70* (2013.01)
*H04L 12/873* (2013.01)
*H04L 12/863* (2013.01)
*H04W 84/18* (2009.01)
(Continued)

(52) U.S. Cl.
CPC ............. *H04Q 9/00* (2013.01); *G06F 13/385* (2013.01); *H04Q 2209/82* (2013.01); *Y02D 10/14* (2018.01); *Y02D 10/151* (2018.01)

(58) Field of Classification Search
None
See application file for complete search history.

(56) References Cited

U.S. PATENT DOCUMENTS

2003/0228005 A1    12/2003  Melick et al.
2008/0309481 A1 *  12/2008  Tanaka ................ A61B 5/0002
                                                                  340/539.12

(Continued)

FOREIGN PATENT DOCUMENTS

| DE | 102005059616 A1 | 6/2007 |
| DE | 102007061724 A1 | 6/2009 |
| EP | 1469699 A1 | 10/2004 |

OTHER PUBLICATIONS

International Search Report, dated May 28, 2015, of the corresponding PCT Application PCT/EP2015/055906 filed Mar. 20, 2015.

*Primary Examiner* — Muhammad N Edun
*Assistant Examiner* — Jerold B Murphy
(74) *Attorney, Agent, or Firm* — Norton Rose Fulbright US LLP; Gerard Messina

(57) ABSTRACT

A sensor system including a sensor data buffer, the sensor data buffer being configured in such a way that sensor data are organized in frames. The sensor data buffer is configured in such a way that a frame has a header and a sensor data area.

8 Claims, 3 Drawing Sheets

(51) Int. Cl.
*H04Q 9/00* (2006.01)
*G06F 13/38* (2006.01)

(56) References Cited

U.S. PATENT DOCUMENTS

| | | | |
|---|---|---|---|
| 2011/0182232 A1* | 7/2011 | Padmanabh | H04L 67/12 370/328 |
| 2013/0089328 A1* | 4/2013 | Davis | H04L 12/2885 398/58 |
| 2013/0145236 A1* | 6/2013 | Baker | H03M 13/116 714/776 |
| 2013/0208165 A1* | 8/2013 | An | H04N 5/232 348/333.05 |
| 2014/0278217 A1* | 9/2014 | Keal | G01C 21/16 702/150 |

* cited by examiner

| G1(6) |
|---|
| A1(6) |
| G2(6) |
| U(6) |
| G3(6) |
| U(6) |
| G4(6) |
| U(6) |
| G5(6) |
| A2(6) |
| G6(6) |
| U(6) |
| G7(6) |
| U(6) |
| G8(6) |
| U(6) |

Typ A

Fig. 2 A

| G1(6) |
|---|
| A1(6) |
| G2(6) |
| G3(6) |
| G4(6) |
| G5(6) |
| A2(6) |
| G6(6) |
| G7(6) |
| G8(6) |

Typ B

Fig. 2 B

SENSOR SYSTEM WITH A SENSOR DATA BUFFER

FIELD

The present invention is directed to a sensor system including a sensor data buffer, the sensor data buffer being configured in such a way that the sensor data are organized in frames.

BACKGROUND INFORMATION

Sensor subsystems in mobile computing devices (MCD) must be implemented in an energy efficient way in order to guarantee, for example, long battery life. The sensors in the MCD are often connected to application processors via a digital interface. Waking the application processor to read each result of a measurement of a sensor is not energy efficient enough for continuously running applications, such as step counters for fitness applications. Today, sensors implement sensor data buffers, for example, in the form of a FIFO memory, to buffer the measured data. The application processor reads the collected measured data during a wake-up cycle. If a sensor measures more than one measured variable, these are preferably stored in a common sensor data buffer, so that information such as sequence and, if necessary, concurrency of data from different sensors is retained. For example, in one sensor, acceleration and rotational speed may be measured. FIG. 1 shows a sensor system of this type in an MCD.

In a sensor which may measure multiple measured variables, often only a subset of the available measured variables is needed. Therefore, often only a subset of the measured variables is detected and recorded in the sensor data buffer. It is possible that the subsets of the determined and saved measured variables deterministically change, as, for example, in measured variables with different sampling frequencies. It is possible that the subset of the determined and to be saved measured variables does not change deterministically, as, for example, is the case when the MCD does not need a sensor variable for a specific time frame.

In order to cover the varying subset of the measured variable, some of the present solutions retain memory space for all possible measured variables in the sensor data buffer. FIG. 2A shows an example of this as type A. A sensor data buffer structure is shown which respectively reserves 6 bytes for gyroscope and accelerometer data. The measured data are designated with sequential numbers, e.g., G5(6) means the 5$^{th}$ sample from the gyroscope having a length of 6 bytes. The memory slots designated with U are not used. The example shows a sensor data buffer content with 8 samples from the gyroscope and 2 samples from the accelerometer. In the example, the gyroscope has four times the data rate of the accelerometer.

Other solutions in the related art optimize the memory space usage, in that they define a convention as to how the data are stored in the memory. The same example is used in FIG. 2B as type B. In this case, the MCD must implicitly know the sequence in which the data are recorded.

Deviations therefrom are not possible.

The previously described type A sensor data buffer has the shortcoming that often the memory space is only partially used. This leads to the fact that the application processor of the MCD must be wakened more often than would be necessary if the entire available memory space were used. Using the type B sensor data buffer, scenarios with deterministic changes of the subset of the measured variables may be efficiently implemented. For each non-deterministic change, however, the sensor data buffer must be deleted and data are lost. In addition, there is the risk that the synchronization between the sensor data buffer and the MCD is lost, which may easily lead to data integrity errors.

In both types A and B, the sensor data buffer must be deleted when sensor parameters are changed.

In both types A and B, the synchronization of the data in the sensor data buffer with external data is complex. This may, however, be necessary, e.g. when a gyroscope must be synchronized with a camera for electronic image stabilization.

SUMMARY

It is an object of the present invention to provide a sensor data buffer architecture which preferably unites all advantages of the existing solutions without their disadvantages. In addition, an efficient synchronization of the sensor data with external events is to be supported.

The present invention is directed to a sensor system including a sensor data buffer, the sensor data buffer being configured in such a way that the sensor data are organized in frames. In accordance with the present invention, the sensor data buffer is configured in such a way that a data frame includes a header and a sensor data area. Advantageously, a sensor system of this type may be newly configured during operation without deleting the data in the buffer or having to reboot the system.

One advantageous embodiment of the sensor system according to the present invention provides that the header indicates which measured variables are contained in the sensor data area. It is hereby advantageous that the memory is used compactly, as only the data are stored which are available for the frame and the data composition may change from frame to frame.

One advantageous embodiment of the sensor system according to the present invention provides that the frame contains metadata.

One particularly advantageous embodiment of the sensor system according to the present invention provides that the frame contains a time stamp for the sensor data as metadata. Advantageously, the sensor data may thus also be assigned to specific points in time, even for non-realtime data transmission, thus sensor data fusion, in particular, is improved or even made possible for the first time.

One particularly advantageous embodiment of the sensor system according to the present invention provides that the frame contains the number of lost packets as the metadata. Using this information, the lost packets may be advantageously identified or declared invalid or also reread.

One particularly advantageous embodiment of the sensor system according to the present invention provides that the frame contains configuration data or also configuration changes of the sensor as metadata. Thus, the configuration of the sensor system and its changes may be advantageously communicated during operation.

The reconfigurable sensor data buffer structure according to the present invention contains not only data, but, according to the present invention, also a description of the respective data structure. A frame includes an information block of the description of the data, subsequently called a header, and the data. In addition, headers may designate specific control frames, which contain information about changed sensor parameters. The headers contain information as to which data are contained in the frame; thus it is prevented that unused data have to be kept available in the buffer, as this is the case in type A. If a non-deterministic change is carried out, then this is also visible in the header, and the buffer does not need to be deleted as in type B.

Thus, the memory space is used approximately as efficiently or as efficiently as type A and also the sensor data buffer does not have to be deleted when a non-deterministic change of the subset of the measured variables occurs.

In addition, an efficient synchronization with external events is possible, in that markers are placed in the headers. The events are, for example, made available via external pins. A classic application case is, for example, a camera recording using an MCD, during which all frames are synchronized with the event "film."

BRIEF DESCRIPTION OF THE DRAWINGS

FIGS. 2A and 2B show two types of configurations of sensor data buffers in the related art.

DETAILED DESCRIPTION OF EXAMPLE EMBODIMENTS

The sensor data buffer stores the data in frames. A frame contains a header and measured data or other information. The type of information is defined in the header. A frame may contain measurements from multiple sensor variables; the measured data were recorded at the same point in time.

Figure 1:
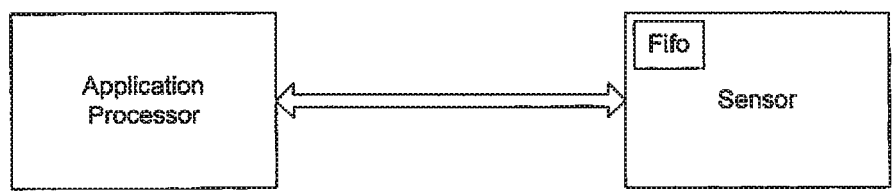
FIG. 1 shows a sensor system in an MCD.
Figure 3:
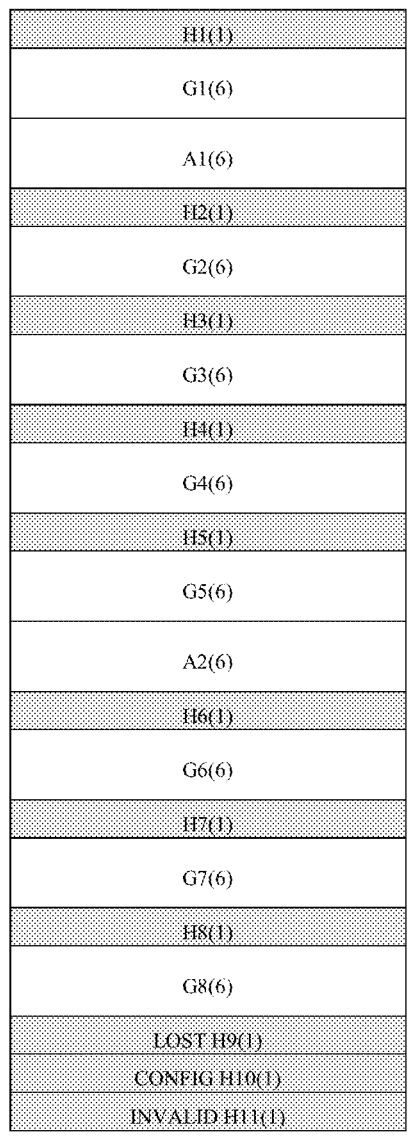
FIG. 3 shows the structure of a sensor data buffer according to the present invention including frames.

FIG. 3 shows the structure of a sensor data buffer according to the present invention including frames. In addition to the data Ax(6) and Gy(6), headers Hi(1) are included. i is a continuous index, 1 is the length of one byte (by way of example).

In the example shown, the first frame begins with a one-byte long header H1(1). This contains, among others, the information that 6-byte rotation rate sensor data G1(6) and 6-byte acceleration sensor data A1(6) are contained in the data part of the frame. The second frame begins with a one-byte long header H2(1). This contains the information that 6-byte rotation rate sensor data G2(6) is contained in the data part of the frame, etc.

The following represents by way of example, how a header may be structured and how it defines the semantics of the data. The following table shows a possible implementation of a header format according to the present invention:

| Bit | 7 | 6 | 5 | 4 |
|---|---|---|---|---|
| Content | fh_mode | | fh_parm<3:2> | |
| Bit | 3 | 2 | 1 | 0 |
| Read/Write | fh_parm<1:0> | | fh_ext | |

The fields fh_mode, fh_parm, and fh_ext describe the type of header, parameters for the type, and expansions.

Invalid (fh_mode=0b00):
The following frames are invalid, i.e., the end of the valid data has been reached (illustrated in FIG. 3 as a frame with an "IMVALID" header H11).

Regular frame (fh_mode=0b10):

| Name | fh_parm<3:0> | | | |
|---|---|---|---|---|
| Bit | 3 | 2 | 1 | 0 |
| Content | pressure_data | mag_data | gyr_data | acc_data |

The fields fh_parm indicate which measured variables are contained in the regular frames. Thus, e.g., '1'('0') data are contained (not contained) for sensor X.

The field fh_ext<1:0>may be used for synchronization with external events.

Control frame (fh_mode=0b01):
Control frames do not contain measured variables, but instead metadata describing the events or changes to the sensor parameters. Examples might be frames missing in the data flow (illustrated in FIG. 3 as a frame with a "LOST" header H9), time stamps, or changes to the sensor configuration, e.g., filter or data rates (illustrated in FIG. 3 as a frame with a "CONFIG" header H10).

The synchronization with external events is carried out via markers in the header, for example, the value of an input pin may be recorded in the fx_ext field. The synchronization with the MCD is thus guaranteed, in that frames, which are read only partially from the reconfigurable sensor data buffer are completely repeated again during the next read access. Thus, an implicit synchronization is provided.

What is claimed is:
1. A device comprising:
a sensor data buffer, wherein:
the device is configured to:
obtain sensor data from a plurality of sensors of the device;
organize the obtained sensor data into sensor-data frames that are stored in the sensor data buffer and are each respectively associated with a respective one of a plurality of time periods by, for each of the plurality of time periods, grouping together all of the sensor data obtained for the respective time period into a single respective one of the sensor-data frames, so that (a) sizes of different ones of the plurality of sensor-data frames differ depending on respective numbers of the plurality of sensors from which sensor data had been obtained for the respective time periods with which the respective sensor-data frames are associated and (b) for each of the plurality of sensors, all data recorded by the respective sensor at different times are separated into different ones of the sensor-data frames that each corresponds to a respective one of the different times;
subsequent to the organization of the obtained sensor data into the sensor-data frames stored in the sensor data buffer of the device, retrieve relevant portions of the sensor data of the sensor-data frames; and
execute an application on the device using the retrieved relevant portions of the sensor data;
each of the sensor-data frames includes a header that identifies all of the sensors whose data is included in the respective sensor-data frame and a sensor data area that includes the sensor data of the respective sensor-data frame; and
the retrieval is performed based on the headers.
2. The device as recited in claim 1, wherein each of the sensor-data frames contains a timestamp for the sensor data of the respective sensor-data frame.
3. The device as recited in claim 1, wherein the sensor data buffer further includes frames that do not contain sensor data and that contain an identification that data has been lost.
4. The device as recited in claim 1, wherein the sensor data buffer further includes frames that do not contain sensor data and that contain configuration data that identifies a configuration of one or more of the sensors or a change to the configuration of the one or more of the sensors.

5. The device as recited in claim 1, wherein the sensor data buffer further includes frames that do not contain sensor data and that contain configuration data that identifies a data rate of one or more of the sensors or a change to the data rate of the one or more of the sensors.

6. The device as recited in claim 1, wherein the sensor data buffer further includes an end-of-valid-data frame that does not contain sensor data and that includes a header that identifies that an end of valid data of the sensor data buffer has been reached so that no valid data is contained in any positions of the buffer beyond a position of the end-of-valid-data frame.

7. The device as recited in claim 1, wherein the sensor data buffer further includes frames that do not contain sensor data and that contain configuration data that identifies a filter of one or more of the sensors or a change to the filter of the one or more of the sensors.

8. The device as recited in claim 1, wherein, with respect to each of the sensor-data frames, all of the sensor data included in the respective sensor-data frame are recorded at a same moment in time.

* * * * *